United States Patent [19]

Ikeda et al.

[11] Patent Number: 5,529,407
[45] Date of Patent: Jun. 25, 1996

[54] IMAGE RECORDING APPARATUS

[75] Inventors: Kunihiko Ikeda, Kodaira; Masahiro Taniguro, Kawasaki; Masaaki Sakai, Tokyo; Hiroyuki Saito, Kawasaki; Tetsuya Ishii; Tadashi Shiina, both of Tokyo; Kenichiro Hashimoto, Yokohama, all of Japan

[73] Assignee: Canon Kabushiki Kaisha, Tokyo, Japan

[21] Appl. No.: 339,878

[22] Filed: Nov. 14, 1994

Related U.S. Application Data

[63] Continuation of Ser. No. 6,124, Jan. 19, 1993, abandoned, which is a continuation of Ser. No. 826,639, Jan. 23, 1992, abandoned, which is a continuation of Ser. No. 663,796, Mar. 4, 1991, abandoned, which is a continuation of Ser. No. 266,664, Nov. 3, 1988, abandoned.

[30] Foreign Application Priority Data

| Nov. 9, 1987 | [JP] | Japan | 62-280991 |
| Nov. 9, 1987 | [JP] | Japan | 62-280992 |
| Nov. 9, 1987 | [JP] | Japan | 62-280993 |
| Nov. 9, 1987 | [JP] | Japan | 62-280994 |

[51] Int. Cl.$^6$ .................................................. B41J 3/54
[52] U.S. Cl. ............................................ 400/82; 400/577
[58] Field of Search .................................... 400/82, 583.3, 400/624, 625, 682, 577

[56] References Cited

U.S. PATENT DOCUMENTS

| Re. 28,219 | 10/1979 | Taylor et al. | 346/75 |
| 4,367,395 | 1/1983 | Asakawa et al. | 219/216 |
| 4,407,597 | 10/1983 | Kapp | 400/625 |
| 4,520,400 | 5/1985 | Koumura | 358/296 |
| 4,531,851 | 7/1985 | Kondo | 400/583.3 |
| 4,595,303 | 6/1986 | Kuzuya et al. | 400/82 |
| 4,649,437 | 3/1987 | Watanabe et al. | 358/286 |
| 4,689,652 | 8/1987 | Shimada | 358/471 |
| 4,706,125 | 11/1987 | Takagi | 358/471 |
| 4,747,707 | 5/1988 | Komori | 400/82 |
| 4,789,903 | 12/1988 | Kamada et al. | 358/296 |

FOREIGN PATENT DOCUMENTS

| 183413 | 6/1986 | European Pat. Off. | 400/578 |
| 0227483 | 7/1987 | European Pat. Off. | 400/82 |
| 2912656 | 10/1980 | Germany | 358/296 |
| 3214114 | 11/1982 | Germany | 358/296 |
| 3540443 | 5/1986 | Germany | 358/296 |
| 3511386 | 10/1986 | Germany | 358/296 |
| 58-163685 | 9/1983 | Japan . | |
| 194575 | 11/1983 | Japan | 400/82 |
| 173967 | 8/1986 | Japan | 400/82 |
| 61-225079 | 10/1986 | Japan . | |
| 116881 | 5/1988 | Japan | 400/82 |
| 1159402 | 7/1969 | United Kingdom | 358/296 |
| 2169467 | 7/1986 | United Kingdom | 358/296 |

OTHER PUBLICATIONS

I.B.M. Technical Disclosure Bulletin vol. 27 No. 1B Jun. '84 pp. 841–843.

H. Inagaki, et al., "New Model Small Size High Speed Facsimile" Oct. 1983, Japanese Telecommunications Review (vol. 25), No. 4, pp. 254–259.

*Primary Examiner*—Edgar S. Burr
*Assistant Examiner*—Steven S. Kelley
*Attorney, Agent, or Firm*—Fitzpatrick, Cella, Harper & Scinto

[57] ABSTRACT

An image recording apparatus has a first recording-sheet storing section for storing a first recording sheet, a second recording-sheet storing section for storing a second recording sheet, a serial recording head for effecting image recording on the first recording sheet while travelling with respect to the first recording sheet, a line recording head for effecting image recording on the second recording sheet when the second recording sheet is in a stationary state, a first conveying device for conveying the first recording sheet to the position of the serial recording head; and the second conveying device for conveying the second recording sheet to the position of the line recording head. With this arrangement, it is possible to selectively effect serial recording and line recording and, in addition, to effect recording from an original document as well as recording and reproduction of the thus-read original document. Accordingly, a single recording apparatus can be used to achieve both serial recording and line recording.

32 Claims, 12 Drawing Sheets

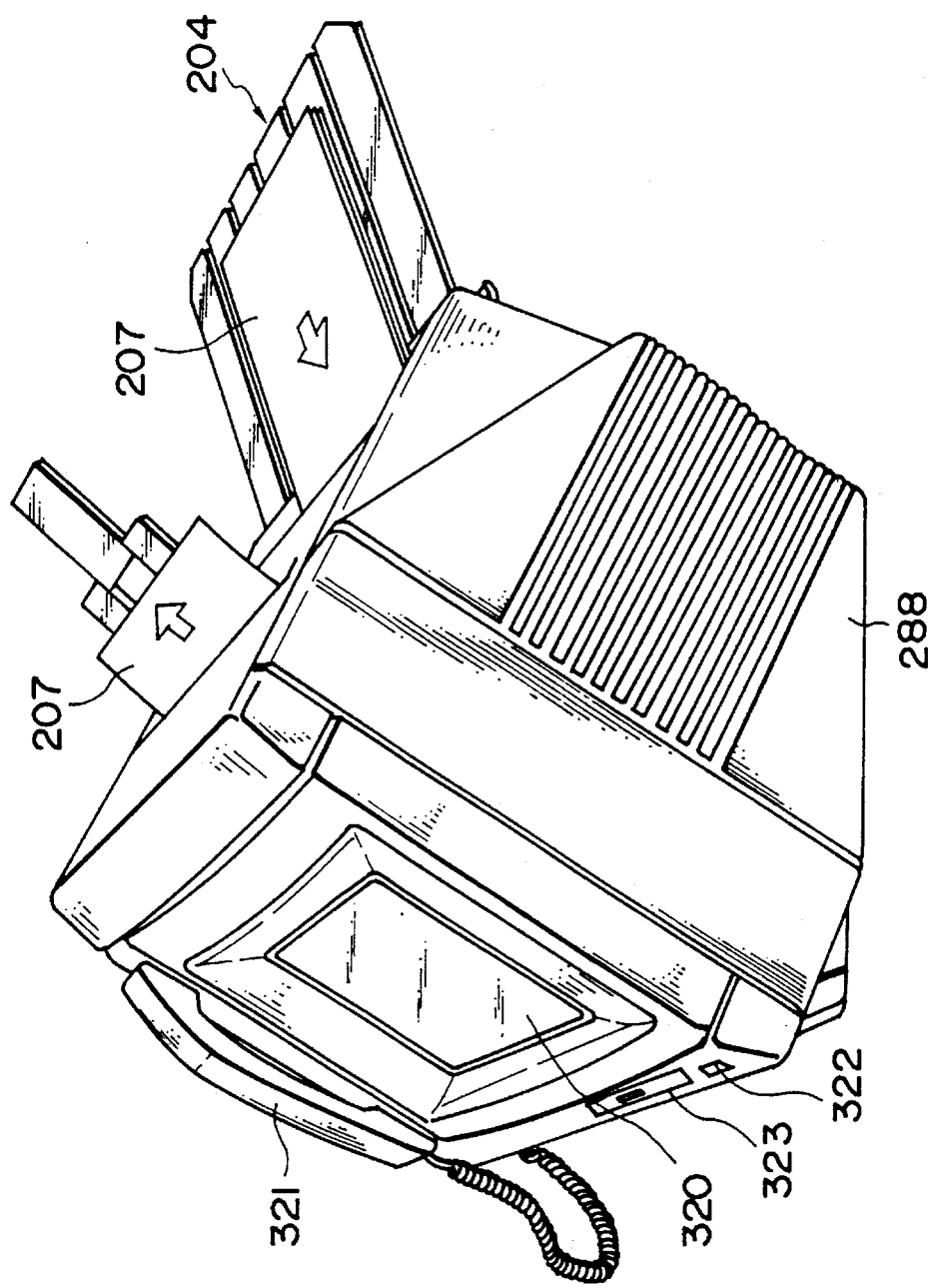

IMAGE RECORDING APPARATUS

This application is a continuation of application Ser. No. 08/006,124 filed Jan. 19, 1993 now abandoned, which is a continuation of application Ser. No. 07/826,639 filed Jan. 23, 1992 now abandoned, which is a continuation of application Ser. No. 07/663,796 filed Mar. 4, 1991 now abandoned, which is a continuation of application Ser. No. 07/266,664 filed Nov. 3, 1988, now abandoned.

BACKGROUND OF THE INVENTION

1. Field of the Invention

The present invention relates to an image recording apparatus for recording an image on a recording medium.

In the present invention, the term "image recording apparatus" embraces a facsimile device, a word processor device, a printer device, an electronic typewriter, a copying device and so forth.

The term "recording medium" embraces ordinary paper, processed paper, plastic sheets, and so forth.

2. Related Background Art

It has been proposed to provide a serial printer of the type in which a carriage which carries a recording head is moved along the length of a platen to effect recording. It has also been proposed to provide a line printer of the type in which a line head is located approximately perpendicularly to the scanning direction of recording paper so as to effect recording in units of lines.

Each of these printers has its own merits and demerits. For example, line printers generally have higher print speeds than serial printers. However, when line printers of the thermal transfer type are composed with serial printers of the same type, the amount of ink ribbon consumed by the former is larger than that of ink ribbon consumed by the latter. Accordingly, the line printers have the problem that running cost tends to increase. When image information or the like is to be recorded on thermal sensitive paper by means of a thermal head or the like, line printers are advantageous over serial printers since the line printers have higher recording speeds.

As is evident from the foregoing, it is desirable that recording be done by a recording method which is appropriate for the recording method being used, for example, the thermal transfer method or the thermal sensitive method, or the kind of data to be recorded, for example, whether image data or print data is to be recorded. However, no recording apparatus has been found of the type having a single-unit arrangement which enables appropriate selection between a plurality of recording methods.

For example, if a facsimile device or the like is utilized, image information can be read and recorded on thermal sensitive paper in units of lines, thereby effecting formation of an image. However, when a document output from a word processor is to be printed on ordinary paper, another recording apparatus must be prepared. Accordingly, no recording apparatus has been found of the type having a single-unit arrangement which can satisfy both of the functions.

SUMMARY OF THE INVENTION

It is, therefore, an object of the present invention to provide an image recording apparatus in which it is possible to select a desired one from among recording methods.

It is another object of the present invention to provide an image recording apparatus in which it is possible to selectively use a serial recording method and a line recording method.

It is another object of the present invention to provide an image recording apparatus in which the cost of image recording can be reduced by selecting an appropriate recording method.

It is another object of the present invention to provide an image recording apparatus in which image recording speeds can be increased by selecting an appropriate recording method.

It is the other object of the present invention to provide an image recording apparatus provided with the reading function of reading image information.

To achieve the above and other objects, in accordance with the present invention, there is provided an image recording apparatus has a first recording-sheet storing section for storing a first recording sheet; a second recording-sheet storing section for storing a second recording sheet; a serial recording head for effecting image recording on the first recording sheet while travelling with respect to the first recording sheet; a line recording head for effecting image recording on the second recording sheet when the second recording sheet is in a stationary state; a first feeding device for feeding the first recording sheet to the position of the serial recording head; and the second feeding device for feeding the second recording sheet to the position of the line recording head.

With this arrangement, it is possible to perform serial recording on a sheet-like medium and also to perform recording in units of lines through the line recording head. In addition, it is possible to effect reading from an original document as well as recording and reproduction of the thus-read original document. Accordingly, a single recording apparatus can be used to achieve both serial recording and line recording, and an image recording apparatus is provided which is capable of effecting image recording by using an optimum recording method which has been appropriately selected.

BRIEF DESCRIPTION OF THE DRAWINGS

FIGS. 3A to 3C are perspective views respectively showing different appearances of a built-in display type reader printer to which the present embodiment is applied;

BRIEF DESCRIPTION OF THE PREFERRED EMBODIMENT

A preferred embodiment of the present invention will be described below with reference to the accompanying drawings.
(Overall Construction of Reader Printer (FIG. 1)

Figure 1:
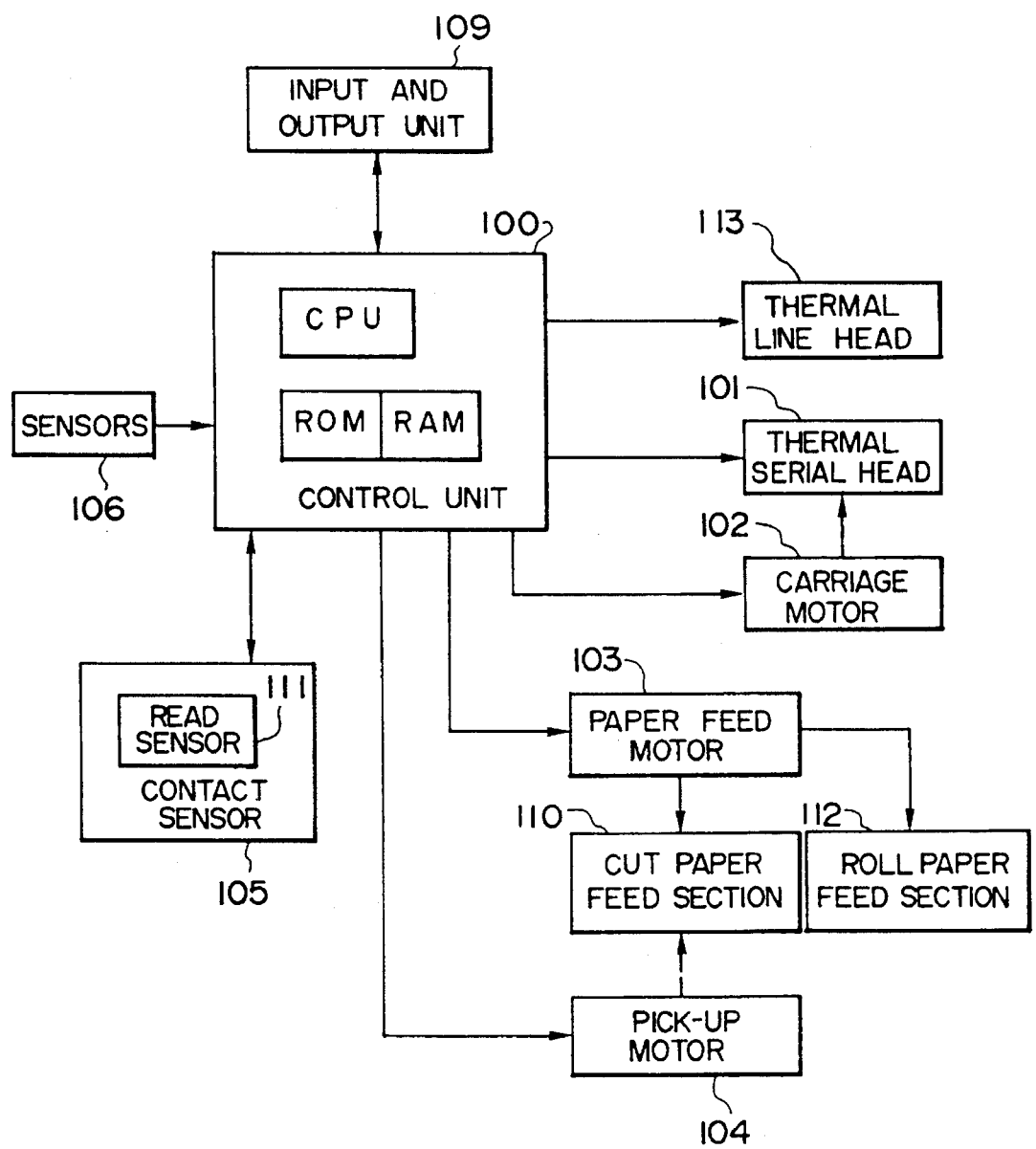
FIG. 1 is a block diagram showing the functional construction of a recording apparatus according to the presently preferred embodiment.

FIG. 1 is a function block diagram showing in schematic form the functional construction of a reader printer according to the presently preferred embodiment.

Figure 9A:
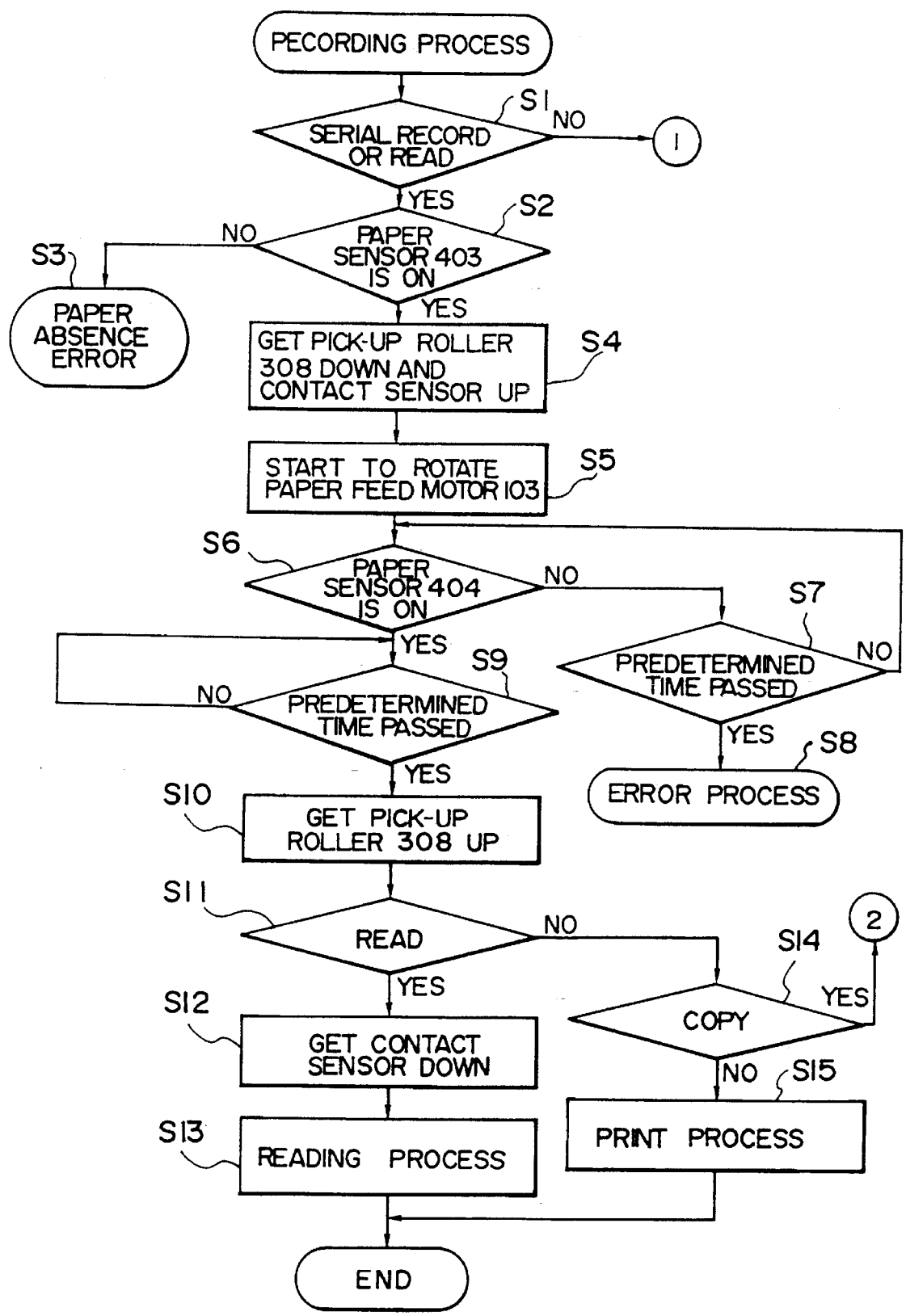
FIGS. 9A to 9C are flowcharts showing the operation of the recording apparatus according to the embodiment.
Figure 9B:
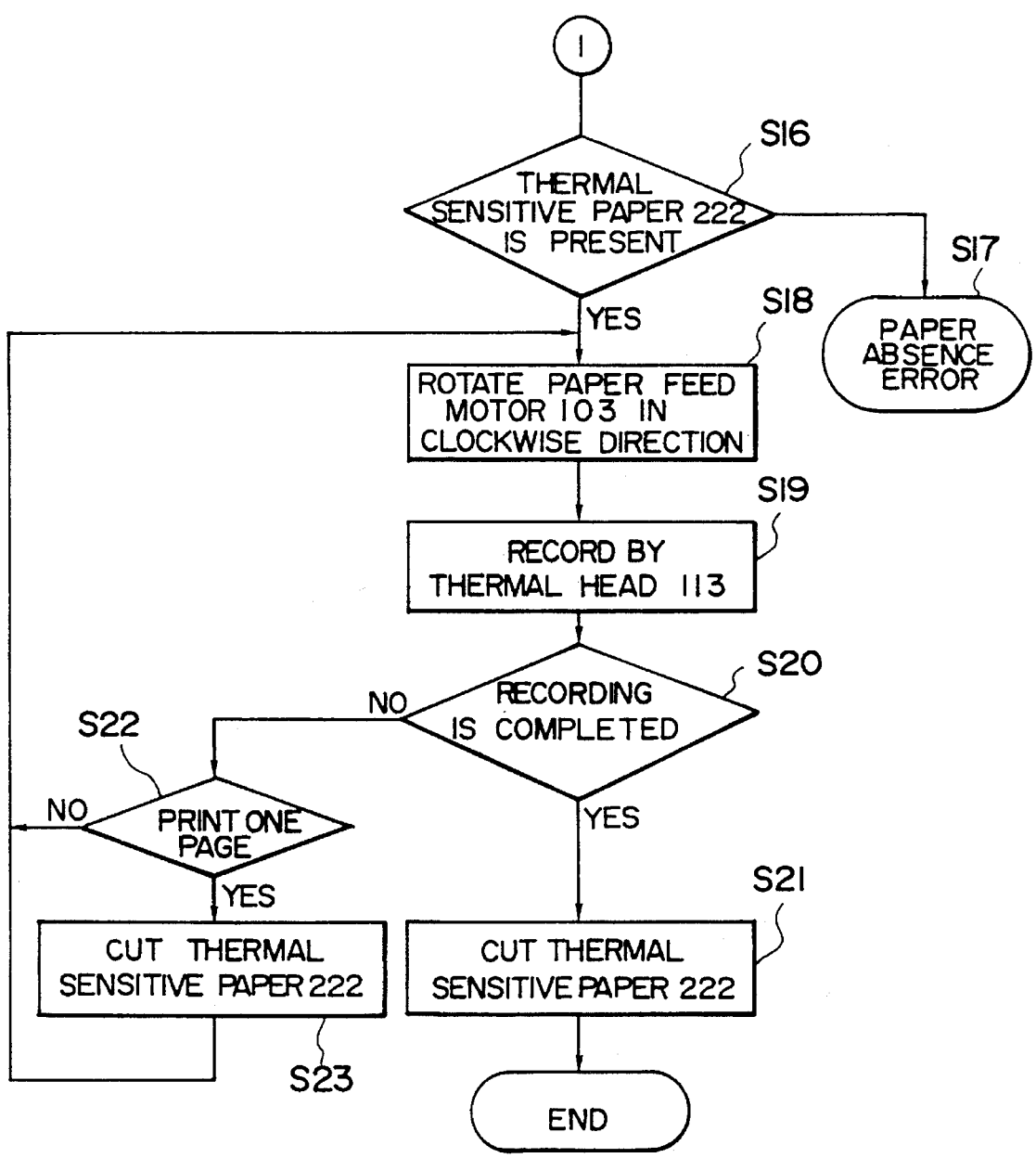
Figure 9C:
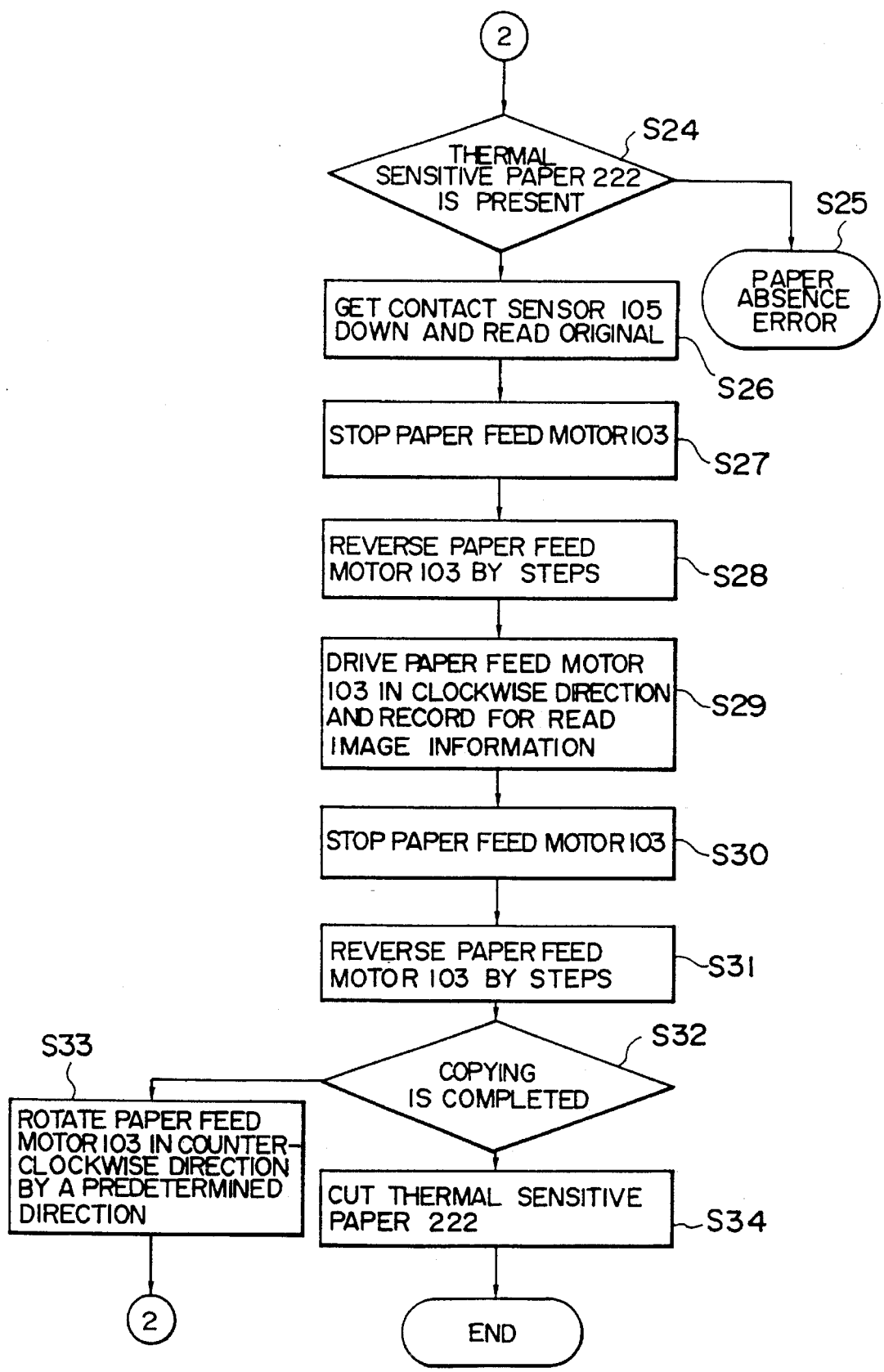

In FIG. 1, a control unit for controlling all the portions of the apparatus (or reader printer) is indicated at 100, and the control unit 100 is provided with a CPU such as a microprocessor, a ROM which stores in advance various kinds of data and the control programs, executed by the CPU, shown in FIGS. 9A to 9C in flow chart form, a RAM which serves as the work area used by the CPU and in which various data is temporarily stored, and so forth. A thermal serial head 101 is carried on a carriage 200 so as to effect serial recording, and the carriage 200 further carries a carriage motor 102 and its associated elements. The carriage motor 102 is arranged to cause movement of the carriage 200 and an inked ribbon loaded thereon for the purpose of thermal transfer recording.

A paper feed motor 103 is arranged to feed recording paper, an original document to be read, or the like. When the paper feed motor 103 is activated in the counterclockwise direction, the rotational force of the paper feed motor 103 is transferred to a sheet on which thermal transfer recording is to be effected by the thermal serial head 101 or a cut paper feed section 110 for feeding an original document or the like from which image information is to be read by a read sensor 111. When the paper feed motor 103 is activated in the clockwise direction, the rotational force of the paper feed motor 103 is transmitted to a roll paper feed section 112 for feeding a thermal sensitive paper, stored in a rolled form, on which recording is to be effected by a thermal line head 113.

A pick-up motor 104 is arranged to move up and down a pick-up roller 308 provided in the cut paper feed section 110 as well as the read sensor 111 of a read section 105. As the pick-up motor 104 is activated, cams which will be described later are driven by the rotational force of the pick-up motor 104. The pick-up roller 308 and the read sensor 111 are interlockingly moved up and down by the motion of the cams, thereby controlling feeding of the recording paper or the like which is stored in a paper storing section (or stacker).

A contact sensor 105, which serves to photo-electrically read an original document, is disposed on a paper feed path located in the cut paper feed section 110. A lamp 114 (to be described later) is lit in accordance with the command supplied from the control unit 100 and image information is read from the original document by the read sensor 111. The image information thus read out is converted into digital signals and transferred to the control unit 100. The read sensor 111 is a line sensor having a width which is approximately the same as the original document to be read, and is disposed approximately perpendicularly to the direction of document feed. A group of sensors, denoted by 106, includes a paper sensor for detecting whether or not paper has been fed, a home position sensor for detecting whether the carriage 200 has reached its home position, a guide sensor for detecting the width of a sheet by utilizing the position of the paper, a ribbon sensor for detecting the presence or absence of an ink ribbon, and so forth. An input and output unit 109 is arranged to receive recording data from external equipment (not shown) and input the received data to the control unit 100, and to receive, from the control unit 100, the image data on the original document which has been read by the read sensor 111 and output the received data to the external equipment or the like.

The thermal line head 113 is disposed approximately perpendicularly to the direction in which thermal sensitive paper is fed, and is arranged to effect recording by lines on the basis of recording data for one line which is transmitted from the control unit 100.

With the above-described arrangement and construction, it is possible to feed sheets from the stacker to a serial recording position in a one-by-one fashion and effect thermal transfer recording based on the data supplied from the external equipment. Similarly, it is possible to feed original documents stacked on the stacker to a read position in a one-by-one fashion and read image information from the original document.

Furthermore, in accordance with command supplied from the external equipment or the kind of recording data, the thermal line head 113 is used to effect thermal recording in units of lines on, for example, thermal sensitive paper stored in a rolled form.

In addition, the image information on an original document which has been read by the read sensor 111 can be recorded on thermal sensitive paper 222 and the recorded information can be reproduced therefrom (that is, can be copied) by means of the thermal line head 113.
Illustration of Cross-sectional Structure of Mechanism Section (FIG. 2)

Figure 2:
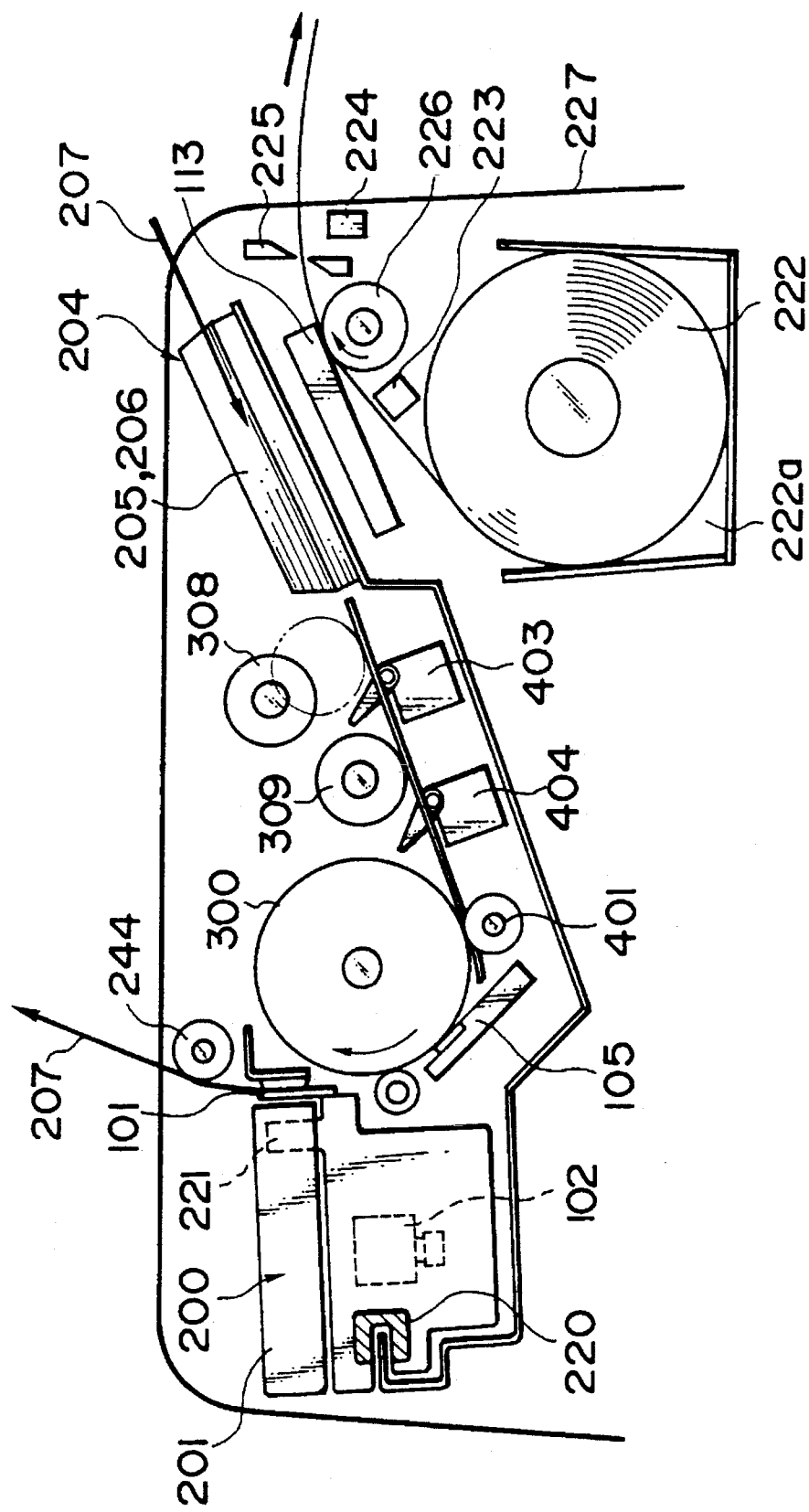
FIG. 2 is a schematic cross-sectional view showing the structure of the mechanism section of the recording apparatus of the embodiment.

FIG. 2 is a diagrammatic cross-sectional view of the structure of the reader printer according to the embodiment. In FIG. 2, the same reference numerals are used to denote elements which are common to those shown in FIG. 1.

In FIG. 2, reference numeral 204 dentoes a stacker on which a number of sheets 207 such as original documents are to be stacked, and the stacker 204 includes paper guides 205 and 206 the positions of which are selected by an operator in accordance with the width of the sheets 207 stacked on the stacker 204. When the pick-up roller 308 is located at the position shown by a dashed line, the sheets 207 are moved from the stacker 204 onto a feed path by the motion of the pick-up roller 308, then separated in a one-by-one fashion by the motion of a separation roller 309, and then fed toward a platen 300 along the feed path.

When the sheet 207 is conveyed or fed to a position at which it is clamped between the platen 300 and a pinch roller 401, the pick-up roller 308 is moved up at the position shown by solid lines to inhibit feeding of the next sheet 207 from the stacker 204. A paper sensor 403 for detecting the presence and absence of the sheets 207 on the stacker 204 is disposed adjacent to the feed path at a location downstream of the pick-up roller 308, and a paper sensor 404 for detecting whether or not the sheet 207 has been fed by the separation roller 309 is disposed adjacent to the feed path at a location downstream of the separation roller 309.

The sheet 207 clamped between the platen 300 and the pinch roller 401 is guided to the contact sensor 105 which carries the read sensor 111 and is then fed toward the serial recording posiiton at which the thermal serial head 101 is located. When reading from the sheet 207 is to be effected, the sheet 207 to be read is stopped at the reading position at which the read sensor 111 is located. The sheet 207 which has moved past the separation roller 309 is clamped between the platen 300 and the pinch roller 401, fed by the cooperative rotations of the platen 300 and the pinch roller 401, subjected to serial recording by the thermal serial head 101 or reading by the read sensor 111, and discharged upwardly from the top of the apparatus (or reader printer). The cut paper feed section 110 which includes these sheet feeding rollers and so forth is driven by activating the paper feed motor 103 in the counterclockwise direction.

Reference numeral 201 denotes an ink ribbon cassette which is detachably carried on the carriage 200. The carriage 200 is moved in the direction substantially parallel to a flat platen (in the direction perpendicular to the surface of the sheet of FIG. 2) by the carriage motor 102 carried on the carriage 200. As the carriage 200 moves, serial recording is effected by the thermal serial head 101 by using a thermal sensitive recording method. Reference numeral 221 dentoes a ribbon sensor 221 for detecting the presence or absence of the ink ribbon, and reference numeral 220 dentoes a sensor for detecting whether or not the carriage 200 has reached its home position.

Thermal paper 222 which is wound in a roll-like form is rotatably and detachably accommodated in a paper loading section 222a within the apparatus at a location below the stacker 204 (the sheet feeding path). A roller 226 is disposed above the thermal paper 222 so as to feed it in the direction indicated by an arrow. The thermal line head 113 has a width which is approximately the same as that of the thermal sensitive paper 222, and is disposed approximately perpendicularly to the direction of travel of the thermal sensitive paper 222. The thermal line head 113 is adapted to effect recording in units of lines on the basis of recording data. The roll paper feed section 226 including the roller 226 and arranged to effect feeding of the thermal sensitive paper 222 is driven by the clockwise running of the paper feed motor 103.

A sensor 223 for detecting the presence or absence of the thermal sensitive paper 222 is disposed upstream of the roller 226, and a sensor 224 for detecting whether or not a rear door 227 has been opened for replacement of the thermal sensitive paper 222 and so on is disposed downstream of the roller 226. A cutter 225 is adapted to cut the thermal sensitive paper 222 in units of pages after an image for one page has been recorded on the thermal sensitive paper 222.

Description of Reader Printer with Display (FIG. 3)

Figure 3B:
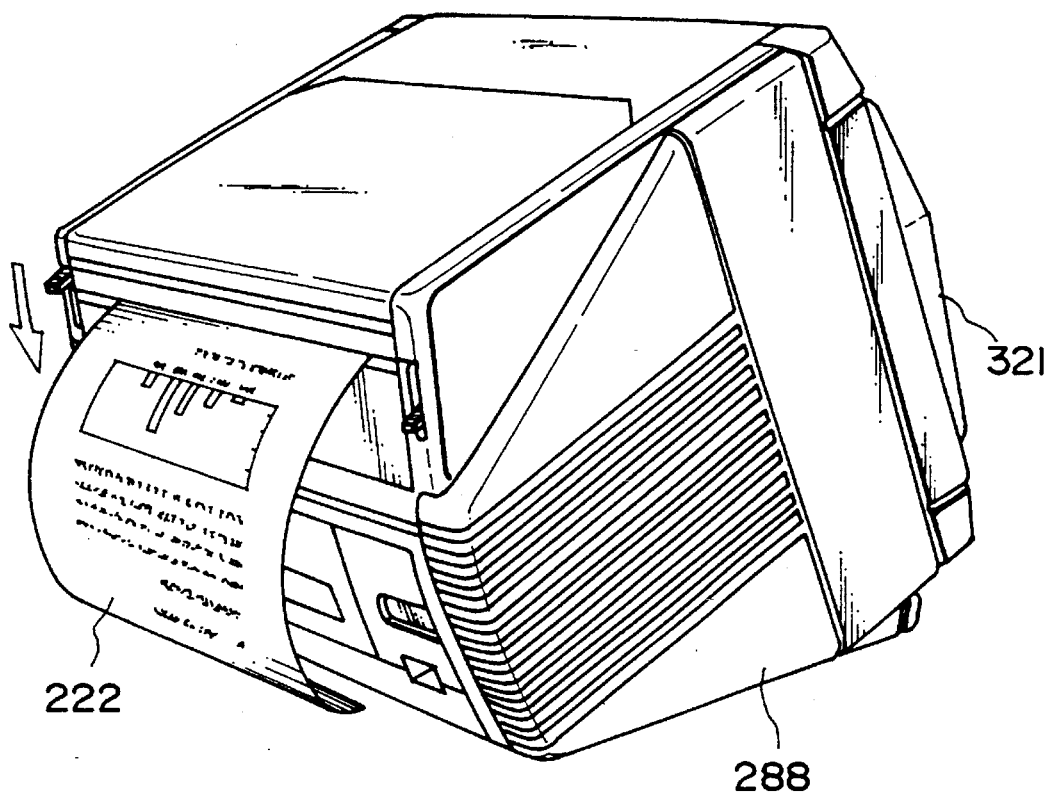
Figure 3C:
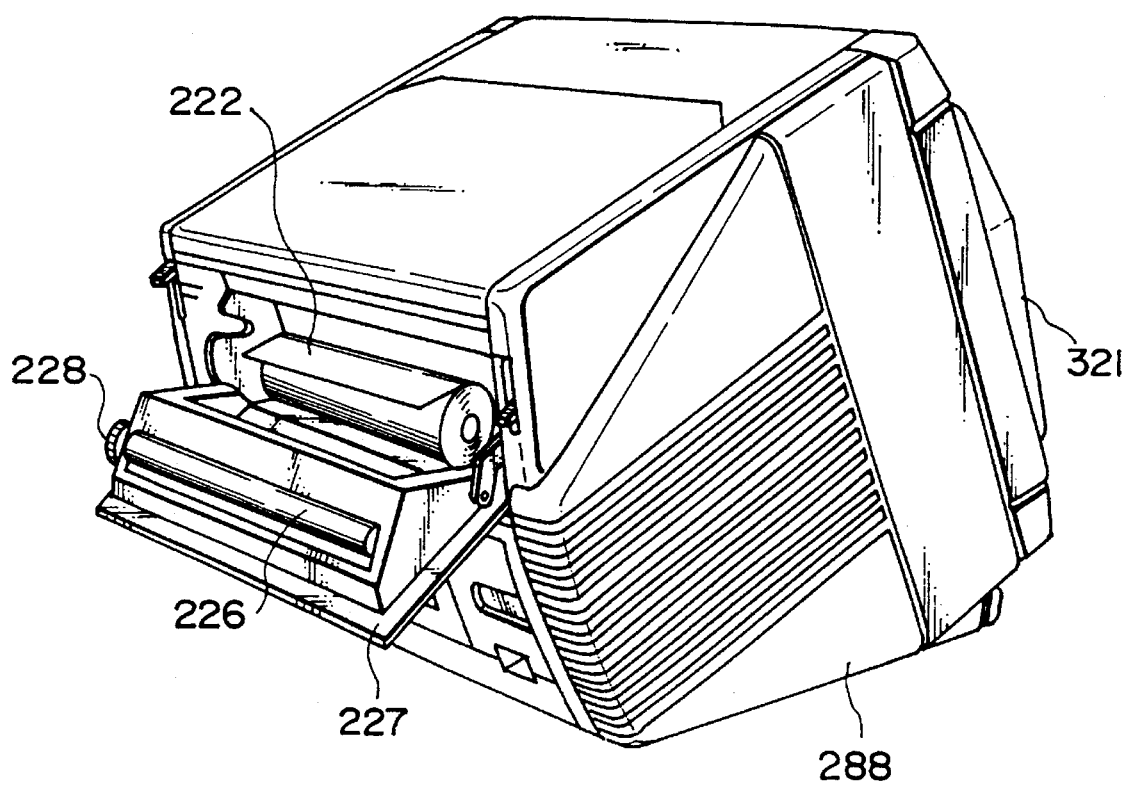

FIGS. 3A to 3C show the appearance of a reader printer with a display of the type which employs the mechanism section according to the embodiment.

FIG. 3A is a perspective view of the appearance of the reader printer. The illustrated apparatus includes a display section 320 such as a CRT which provide a display of input document information, a facsimile image or the like and which functions as a touch panel which allows inputting of coordinates, specification of items and so forth on the screen of the display section 320. Reference numeral 321 denotes a hand set which is used when the reader printer functions as a telephone set. A terminal 322 to which a key board (not shown) is connected is provided on the front of the apparatus, and various kinds of document information or instruction of various functions can be input. An inserting inlet 323 through which a micro floppy disk is inserted is formed in the front of the apparatus, and various document information and various data can be stored on the micro floppy disk.

As illustrated, the sheets 207, such as facsimile documents or recording sheets, which are stacked on the stacker 204, are fed into the apparatus by the cut paper feed section 110 in one-by-one fashion. After completion of reading thorugh the read sensor 111 or after completion of recording through the thermal serial head 101, the sheet 207 is discharged from the top of the apparatus as shown in FIG. 3A.

FIG. 3B is a perspective view of the rear portion of the apparatus, and shows a state wherein the thermal sensitive paper 222 on which recording has been in units of lines is discharged from a discharge portion formed in the rear of the apparatus.

FIG. 3C is a perspective view of the rear portion of the apparatus, and shows a state wherein the rear door 227 has been opened. In this figure, reference numeral 222 denotes roll type thermal sensitive paper and reference numeral 226 denotes a roller for feeding the thermal sensitive paper 222. When the rear door 227 is closed, a gear 228 attached to the shaft of the roller 226 meshes with a corresponding gear provided in the apparatus to transmit the rotational force of the paper feed motor 103 to the roller 226.

Figure 4:
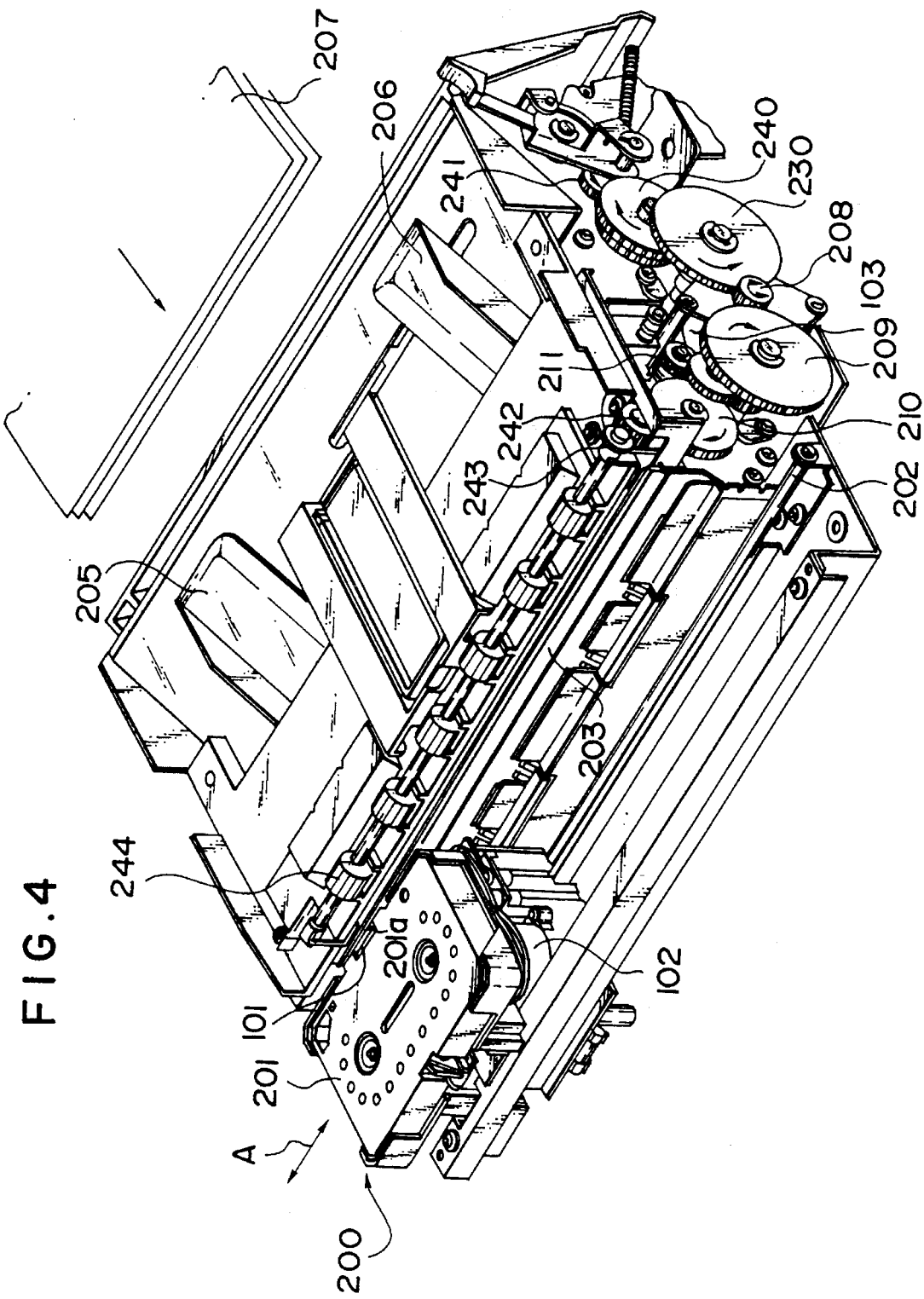
FIG. 4 is a perspective view of the mechanism section of the embodiment.
Figure 5:
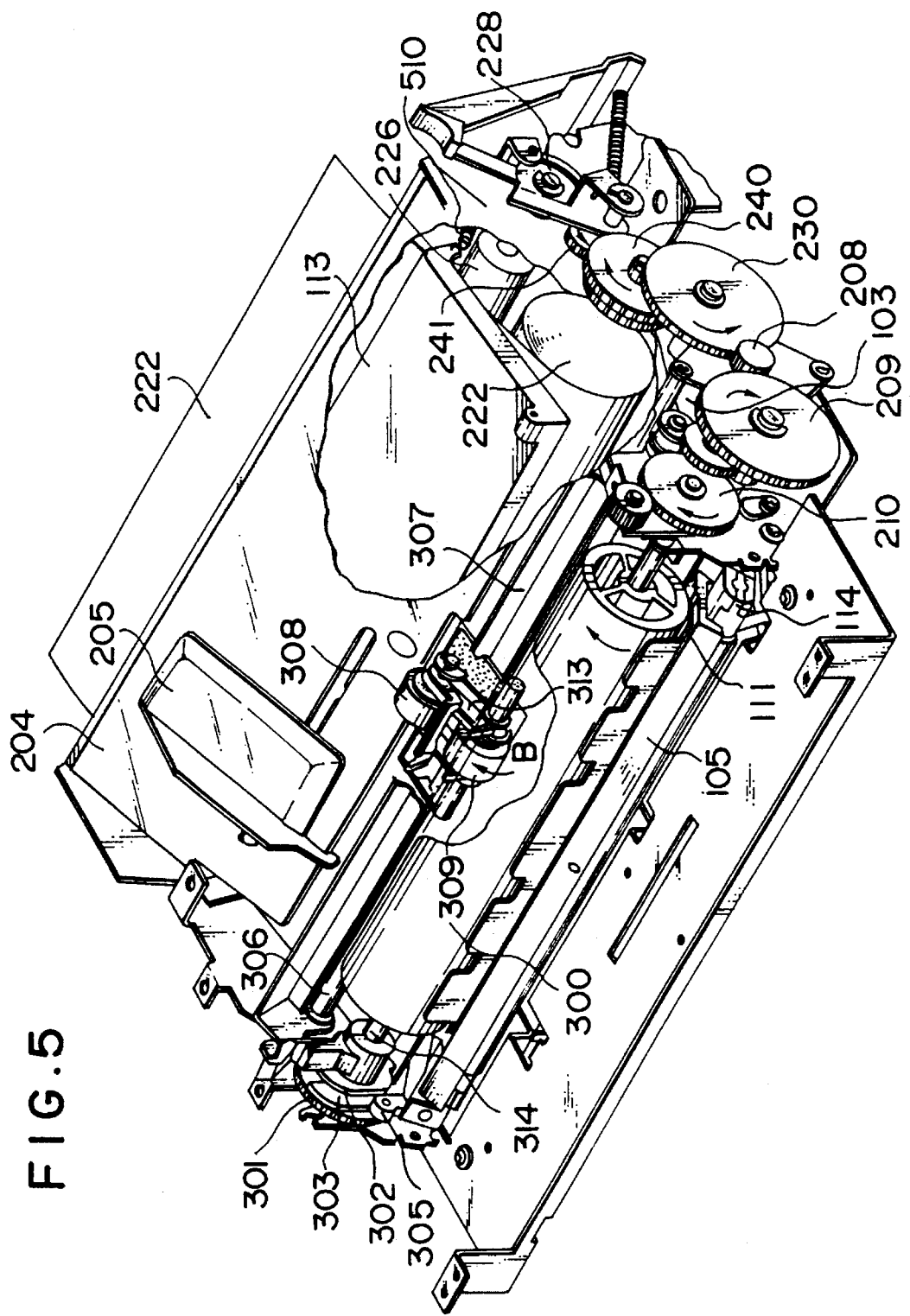
FIG. 5 is a perspective view of the mechanism section of FIG. 4 from which a carriage, an upper frame and so forth are removed.

Description of the Overall Mechanism Section (FIG. 4 to FIG. 5)

FIG. 4 is a perspective view of the appearance of the mechanism section from which is removed a body cover 288 for the reader printer according to the embodiment. FIG. 5 is a perspective view, with portions cut away for the sake of explanation, of the mechanism section from which the carriage section 200 and an upper frame are removed. Incidentally, the same reference numerals are used to denote elements which are common to these figures.

Referring to FIG. 4, an ink ribbon 201a is accommodated in the ribbon cassette 201 which is carried on the carriage 200. The carriage 200 is adapted to be moved along a shaft 202 in approximate parallel with a flat platen 203 in the direction indicated by an arrow A by means of the carriage motor 102. The flat platen 203 is made of a soft material such as rubber and is provided at a location opposing the thermal serial head 101 which is carried on the carriage 200. When the paper feed motor 103 is activated in the counterclockwise direction, the recording paper 207 is fed to the gap between the ink ribbon 201a and the flat platen 203 and is then pressed by the thermal serial head 101 against the flat platen 203. In this state, when the carriage 200 is moved, an image is recorded on the recording paper 207 by thermal transfer recording.

The stacker 204 is arranged to accommodate a plurality of sheets 207, in a stacked form, such as recording paper or original documents to be recorded. The stacker 204 is provided with the slidable paper guides 205 and 206, and their positions are adjusted by an operator to suit the size of the sheet 207 to be used. The positions of the paper slidable paper guides 205 and 206 are detected by a sensor (not shown). The detection signal of the sensor is applied to the control unit 100, and thus the control unit 100 can detect the side of the sheets 207 carried on the stacker 204. Accordingly, in a case where the longitudinal size of the read sensor 111 is equal to, for example, the lateral size of A4 format, if the width of an original document exceeds that of A4 format, it is determined that reading from the original document is impossible or that feeding thereof is impossible (since it is likely that the sheet-like original document is caught by a portion of the read sensor 105).

A gear 208 is attached to the motor shaft of the paper feed motor 103. When the gear 208 rotates in the counterclockwise direction, this rotation is transmitted to a gear 210 through a gear 209 to drive the platen (main roller) 300 and the pinch roller (paper feed roller) 401, both of which will be described later, thereby effectuating feeding of the sheet 207.

When the paper feed motor 103 rotates in the clockwise direction, this rotation is transmitted to gears 240 and 241 through the gears 208 and 230. Thus, when the roller 226 is rotated, the thermal sensitive paper 222 is moved toward the thermal line head 113.

The above-described operation will be described below in greater detail with reference to FIGS. 5 to 8.

As shown in FIG. 5, when the rotation of the motor shaft of the paper feed motor 103 is transmitted to the gear 210 attached to one end of a shaft 314 of the platen 300, the platen (main roller) 300 is rotated in the direction indicated by a corresponding arrow. Cams 302 and 303 are attached to the other end of the shaft 314 of the platen 300. The cams 302 and 303 are driven by the pick-up motor 104, irrespective of the motion of the platen 300. The cams 302 and 303 are formed integrally with the gear 301 and, when the rotation of the output shaft of the pick-up motor 104 is transmitted to the gear 301, the cams 302 and 303 are interlockingly rotated.

The cam 303 is engaged with a cam follower 305 formed on the contact sensor 105 which is equipped with the read sensor 111 and the lamp 114, and the position of the contact sensor 105 can be shifted up and down by changing the rotational position of the cam 302. Similarly, the cam 302 is engaged with the cam follower of a lever 307, and the pick-up roller 308 is moved up and down by rotating the lever 307 about a shaft 306.

The contact sensor 105 which is provided with the lamp 114 and the read sensor 111 is constructed such that the contact sensor 105 can be moved into contact with (down position) and away from (up position) the platen 300. During reading from an original document or in a stand-by state, the contact sensor 105 is located at its down position. During document reading, the light emitted from the lamp 114 is reflected by the facing surface of the document, and the reflected light is incident upon the read sensor 111, in which the incident light is converted into electrical signals. When the sheet 207 is to be fed without performing document reading, the read sensor 111 is shifted to its up position and functions as a guide which enables the shaft 207 to be stably fed to the serial recording position.

The separation roller 309 is attached to the shaft 306 of the lever 307. If the separation roller 309 is located in the down position (in which it is pressed against the sheet 207), the rotation of the paper feed motor 103 is transmitted to the shaft 306 through the gears 208 and 211, thereby rotating the separation roller 309 in the direction indicated by an arrow B. The rotation of the separation roller 309 is transmitted to the pick-up roller 308 through a belt 313, thereby effecting feeding of the stacked sheets 207 accommodated in the stacker 204.

If, on the other hand, the separation roller 309 is located in the up position (in which it is kept away from the sheet 207), the shaft 306 is disengaged from the gear 211. In this state, since the rotation of the output shaft of the paper feed motor 103 is not transmitted to the shaft 306, free rotations of both the shaft 306 and the separation roller 309 are allowed.

Each time a single sheet 207 is fed from the ones stacked on the stacker 204, whether or not the sheet 207 has been fed is confirmed by the paper sensors 403 and 404. Subsequently, at the time that the sheet 207 is clamped between the platen (main roller) 300 and the pinch roller 401, the pick-up roller 308 is shifted up to the position, shown by the solid lines in FIG. 2, by the driving of the pick-up motor 104.

In this state, since the rotation of the output shaft of the paper feed motor 103 is not transmitted to the separation roller 309 or the pick-up roller 308, free rotations of the separation roller 309 and the pick-up roller 308 are allowed.

Thus, subsequently, the sheet 207 is fed by the cooperative rotations of the platen 300 and the pinch roller 401 and, further, the rotation of a train of paper discharge rollers 244 (FIG. 4). Thus, the original document for one page is read by the read sensor 111 or an image for one page is recorded by the thermal serial head 101. When the next sheet 207 is to be fed, the pick-up roller 308 is shifted to the down position (the position shown by dashed line in FIG. 2) and the sheet 207 is fed from the stacker 204 to the interior of the reader printer.

When an image is to be recorded on the thermal sensitive paper 222 by the thermal line head 113, the paper feed motor 103 is activated in the clockwise direction to feed the rolled thermal sensitive paper 222 to the serial recording position at which the head 113 is located. The clockwise rotation of the paper feed motor 103 is fed through the gear 230 to the gear 240 and, finally, the roller 226. The thermal line head 113 is pressed against the roller 226 by a predetermined pressure applied by a spring 510. On the basis of data supplied from the control unit 100, thermal recording is effected in units of lines by the thermal line head 113.

Description of Operation of Cut Paper Feed Section (FIG. 6)

Figure 6A:
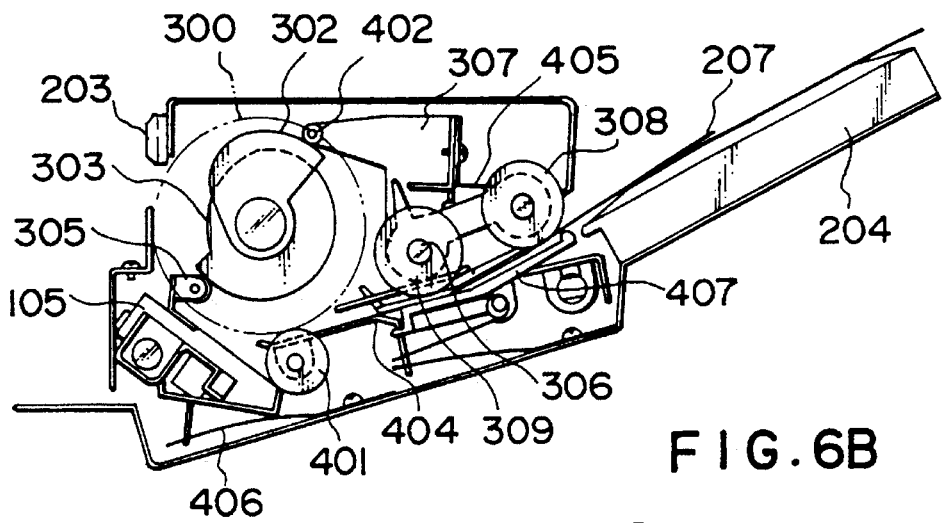
FIGS. 6A to 6C are views showing the positional relationship between a pick-up roller and a contact sensor and the state of sheet feeding in the embodiment.
Figure 6B:
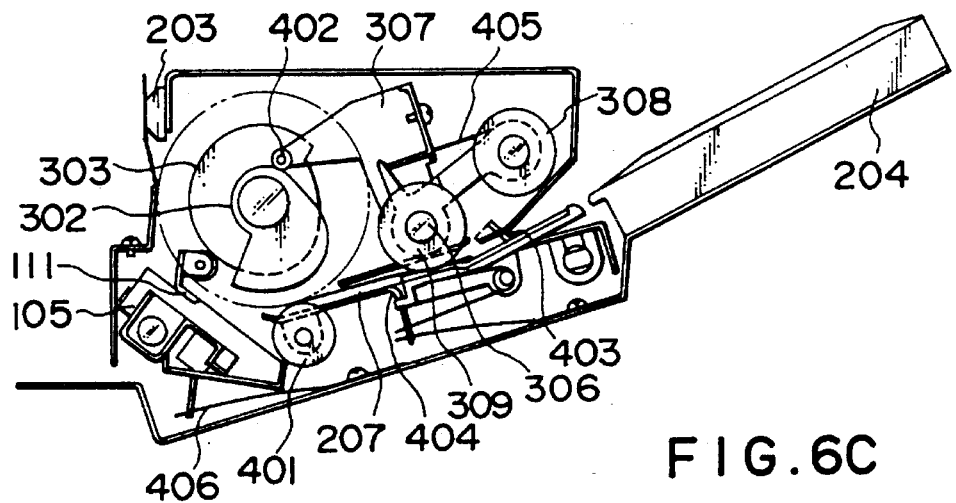
Figure 6C:
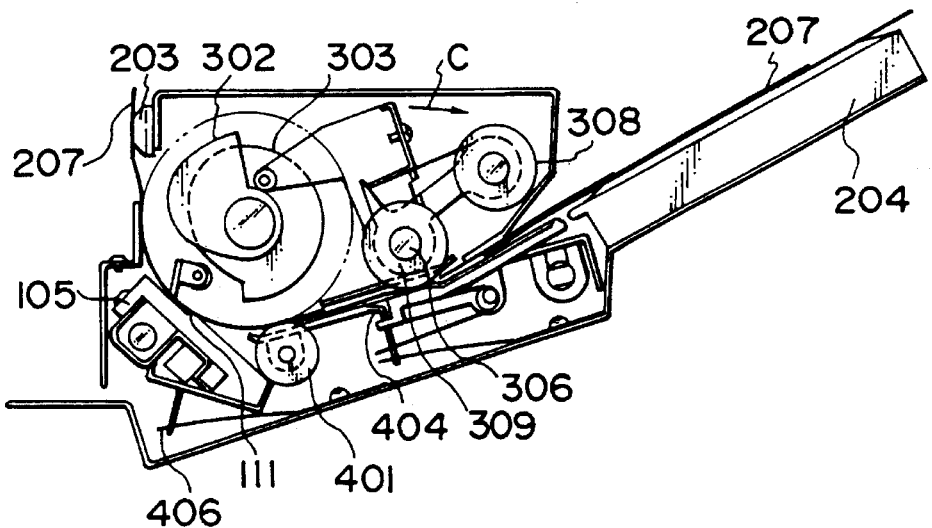

FIGS. 6A to 6C are views showing the relationship between the position of the cams 302, 303 and the behavior of the pick-up roller 308 and the contact sensor 105.

FIG. 6A shows a state wherein feeding of the sheets 207 such as recording paper or original documents from the stacker 204 has just been started. FIG. 6B shows a state immediately after a single sheet 207 has been fed or during image recording by the thermal serial head 101. FIG. 6C shows the states of the pick-up roller 308 and the contact sensor 105 during document reading or in a stand-by state.

In the stand-by state, the pick-up roller 308 is normally lifted up as shown in FIG. 6C and the contact sensor 105 is pressed against the platen 300 by the force of a leaf spring 406 (down position). Thus, the read sensor 111 is shielded from external light and deterioration of the read sensor 111 is prevented.

In this state, when the sheets 207 are set on the stacker 204 and sheet feeding operation is commanded, the cams 302 and 303 are rotated clockwise by the pick-up motor 104. Thus, the cam 302 and a cam follower 402 formed on the lever 307 assume the positional relationship shown in FIG. 6A. FIG. 6A shows a state wherein the lever 307 is rotated about the shaft 306 from the state of FIG. 6C in the direction indicated by an arrow C. In FIG. 6A, the pick-up roller 308 is pressed against the sheets 207 by the force of a leaf spring 405. During this time, the contact sensor 105 is kept away from the platen 300 against the force of the leaf spring 406 by the action of the cam 303 and the cam follower 305, thereby preventing the surface of the read sensor 111 from being abraded by the rotating platen 300.

In the state shown in FIG. 6A, the leading end portion of the sheets 207 has reached a position adjacent to the upstream side of the separation roller 309 and the paper sensor 403 is on. When, in this state, counterclockwise rotation of the paper feed motor 103 is started, the rotation of the output shaft of the paper feed motor 103 is transmitted to both the shaft 306 and the platen 300. The separation roller 309 is rotated with the rotation of the shaft 306, and the rotation of the separation roller 309 is transmitted to the pick-up roller 308 through the belt 313. Thus, the sheets 207 are fed to the gap between the separation roller 309 and a separation plate 407 facing the separation roller 309, and a single sheet 207 is separated from the sheets 207. Subsequently, the single sheet 207 is further advanced to switch on the paper sensor 404 which is disposed between the roller 401 and the separation roller 309.

When the sheet 207 is fed to the gap between the platen 300 and the roller 401 in this manner, the cams 302 and 303 are rotated clockwise, as shown in FIG. 6B, and the urging force applied to the cam follower 402 by the cam 302 disappear, with the result that the pick-up roller 308 is lifted up by the force of a spring (not shown). This operation is performed in order to prevent continuous feeding of the sheets 207 accommodated in the stacker 204. In this manner, it is ensured that the sheets 207 are fed and processed in a one-by-one fashion.

FIG. 6B shows a state wherein serial recording is being performed by means of the thermal serial head 101. In this state, the single sheet 207 is clamped between the platen 300 and the roller 401 and fed by the rotation of the platen 300 in synchronization with the movement of the carriage 200. On the other hand, during document reading, the contact sensor 105 is, as shown in FIG. 6C, pressed against the original document wound around the platen 300 and the original document is fed in synchronization with document reading operation by the rotation of the platen 300. The roller 401 is rotatably disposed and serves as a pinch roller which is pressed against the platen 300 and rotated in interlocking relationship with the rotating platen 300.

When an image is to be recorded, by the thermal serial head 101, on the sheet 207 which has been fed from the stacker 204, the positions of the pick-up roller 308 and the contact sensor 105 are as shown in FIG. 6B. When reading from the sheet 207 is to be performed, the contact sensor 105 is, as shown in FIG. 6C, shifted down to effect reading from the sheet 207. Thus, image recording on the single sheet 207 or reading therefrom is completed. When feeding of the next sheet 207 is commanded, the pick-up roller 308 and the contact sensor 105 assume their respective positions shown in FIG. 6A and the next sheet 207 is fed from the stacker 204.

Figure 7:
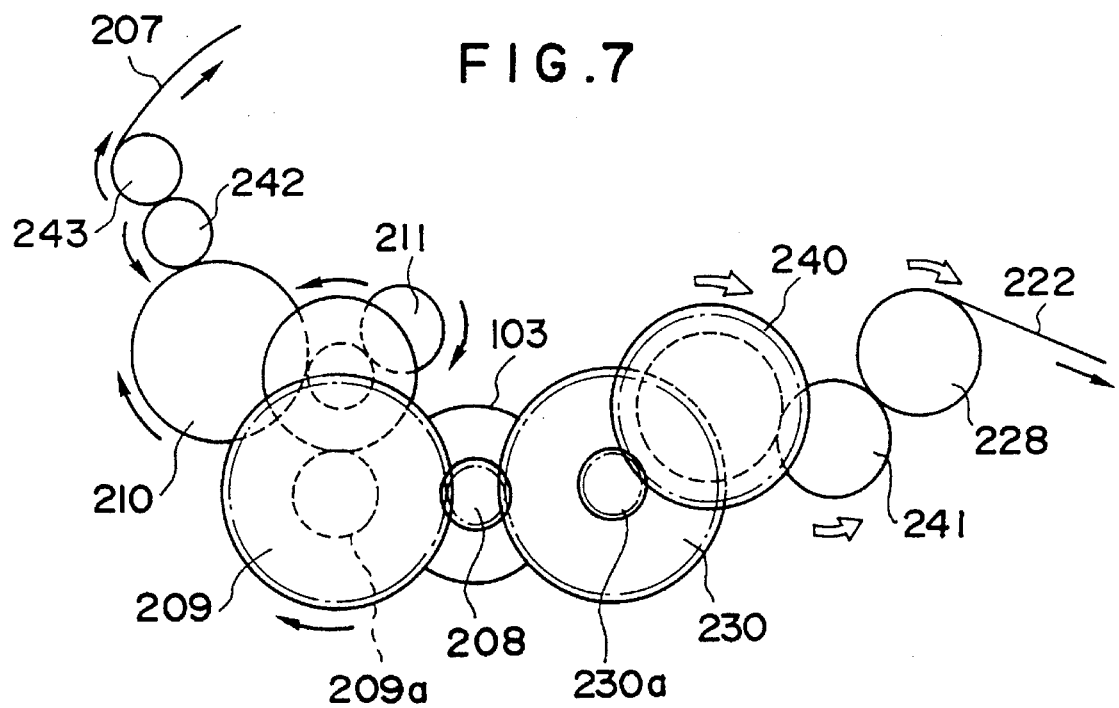
FIG. 7 is a schematic view showing a path for transmission of the rotational force of a paper feed motor in the embodiment.

FIG. 7 is a diagrammatic illustration showing a path through which the rotational force of the paper feed motor 103 is transmitted. As illustrated, when the paper feed motor 103 is activated in the counterclockwise direction, the gears 209 to 211 as well as the gears 242 and 243 are rotated in the directions indicated by corresponding arrows to drive the cut paper feed section 110.

When, on the other hand, the paper feed motor 103 is activated in the coutnerclockwise direction, its rotational force is transmitted through the gear 230 to the gear 240, 241 and 228, and finally the roller 226, and thus feeding of the thermal sensitive paper 222 which is stored in a roll-like form is performed.

Figure 8:
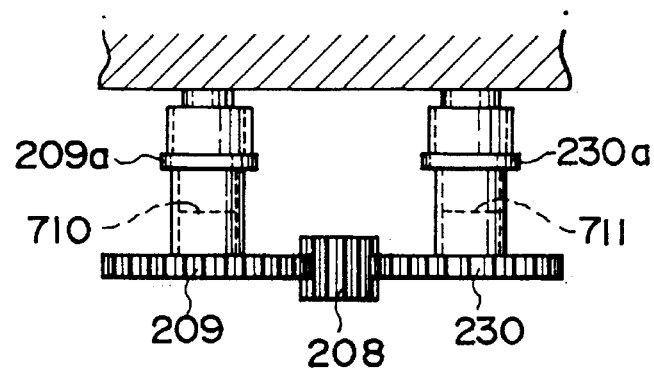
FIG. 8 is a diagrammatic view showing the structure of a gear section for transmission of the rotational force of the paper feed motor.

FIG. 8 shows the structure of a portion which includes the gears 209 and 230 for transmitting the rotational force of the paper feed motor 103.

The shafts 710 and 711 of the gears 209 and 230 each have a spring clutch structure. More specifically, only when the gear 208 is rotated in the clockwise direction while the gear 209 is being rotated in the counterclockwise direction, the rotation of the gear 209 is transmitted to a gear 209a. On the other hand, only when the gear 208 is rotated in the clockwise direction while the gear 230 is being rotated in the coutnerclockwise direction, the rotation of the gear 230 is transmitted to the gear 230a.

In this manner, when the paper feed motor 103 is activated in the clockwise direction, the gear 209 slips and its rotation is not transmitted to the gear 209a, but the rotation of the gear 230 is transmitted to the gear 230a to drive the roll paper feed section 112 alone. Conversely, when the paper feed motor 103 is activated in the counterclockwise direction, the gear 230 idles but the rotation of the gear 209 is transmitted to the gear 209a to drive the roll paper feed section 110.

Description of Operation (FIG. 9)

FIGS. 9A to 9C are flow charts which serve to illustrate the operation of the reader printer according to the presently preferred embodiment. The programs designed to execute the present operation are stored in the ROM of the control unit 100.

Prior to the start of the present operation, the contact sensor 105 is lifted down with the pick-up roller 308 lifted up, and the overall mechanism is in the state shown in FIG. 6C. The present programs are started by inputting a document readout instruction or a print instruction through external equipment or an operation panel.

In Step S1, a decision is made as to whether or not serial recording or image reading is to be carried out, that is, whether or not the cut paper feed section 110 is to be driven. If it is determined that the cut paper feed section 110 is to be driven, the process proceeds to Step S2, in which a decision is made as to whether or not the paper sensor 403 is on. If not, the process proceeds to Step S2, in which it is determined that a paper absence error has occurred.

If the paper sensor 403 is not on, the process proceeds to Step S4, in which case the cams 302 and 303 are rotated in the counterclockwise direction by the pick-up motor 104 to shift the pick-up roller 308 to its down position while moving the contact sensor 105 away from the platen 300. Thus, the state of FIG. 6C is shifted to the state of FIG. 6A. In Step S5, counterclockwise driving of the paper feed motor 103 is started and thus feeding of the sheets 207 accommodated in the stacker 204 is started.

In step S6, the process waits until the paper sensor 404 is switched on. If the paper sensor 404 is not switched on within a predetermined time period (Step S7), the process proceeds to Step S8, in which case error processing such as removal of jammed paper is carried out.

When it is judged in Step S6 that the paper sensor 404 is switched on, the process proceeds to Step S9, where the process waits until the time period long enough for the sheet 207 to be fed to the gap between the platen 300 and the pinch roller 401. When the sheet 207 is fed to the gap between the platen 300 and the pinch roller 401 and feeding of the sheet 207 is started by the rotations of the platen 300 and the pinch roller 401, the process proceeds to Step S10. In Step S10, the pick-up roller 308 is lifted up as shown in FIG. 6B. Thus, feeding to the next sheet 207 from the stacker 204 is inhibited.

In Step S11, a decision is made as to which of document reading operation and image recording operation using the thermal serial head 101 is carried out. If document reading operation is to be carried out, the process proceeds to Step S11, in which the leading end of the document sheet is fed to the read position of the read sensor 111 and the contact senor 105 is shifted down. In Step S13, each time the original document is shifted by a predetermined amount, various reading processes are carried out; for example, the read sensor 111 effects reading from the original document in units of lines and the image signal this read out is transmitted as a facsimile signal or supplied to external equipment through the input and output unit 109.

On the other hand, if document reading is selected in Step S11, the process proceeds to Step S14, in which a decision is made as to whether or not a copy process for reading image formation an original document by means of the read sensor 111 and recording it on the thermal sensitive paper 222 is selected. If the copy process is not selected, the process proceeds to Step S15, in which the sheet 207 is fed to the position of the flat platen 203 and a print process is performed in which the carriage 200 is moved in a scanning manner to effect serial image recording by means of the thermal serial head 101.

If it is determined in Step S1 that recording on the thermal sensitive paper 222 has been selected, the process proceeds to Step S16 of FIG. 9B, in which, on the basis of the result of detection of the sensor 223, it is determined whether or not the thermal sensitive paper 222 is present. If the thermal sensitive paper 222 is absent, the process proceeds to Step S17, in which it is determined that a paper absence error has occurred. If it is determined in Step S17 that the thermal sensitive paper 222 is present, the process proceeds to Step S18, in which the paper feed motor 103 is activated in the clockwise direction to perform feeding of the thermal sensitive paper 222. Then, in Step S19, image recording for one line is performed through the thermal line head 113. In Step S20, a decision is made as to whether or not image recording of all the data has been completed. If it has not yet been completed, the process proceeds to Step S22, in which a decision is made as to whether or not a print process for one page has been completed. When the print process for one page is completed, the process proceeds to Step S23, in which the running of the paper feed motor 103 is stopped and the thermal sensitive paper 222 is cut into a sheet of one-page size by a cutter 225. The process again returns to Step S18, in which the above-described process is repeated. If it is determined in Step S20 that all the data has been printed, the process proceeds to Step S21, in which the running of the paper feed motor 103 is stopped and the thermal sensitive paper 222 is cut into a sheet of predetermined size by the cutter 225. Thus, the process is completed.

If it is determined in Step S14 that the copy process has been selected, the process proceeds to Step S24 of FIG. 9C, in which, as in Step S16, on the basis of the signal supplied by the sensor 223, a decision is made as to whether or not the thermal sensitive paper 222 is present. If the thermal sensitive paper 222 is present, the process proceeds to Step S16, in which the output shaft of the paper feed motor 103 is rotated by a predetermined amount in the counterclockwise direction, then a sheet document is fed to the read position of the read sensor 111, and then the contact sensor 105 is shfited down to effect reading from the original document. In Step S27, the counterclockwise running of the paper feed motor 103 is stopped and, in step S28, the paper feed motor 103 is reversed clockwise by several steps. The clockwise operation is performed in order to compensate for the backlash between the gear 230 and the gear 208 both of which are rotated for feeding of the thermal sensitive paper 222.

As shown in FIG. 8, when the paper feed motor 103, that is, the gear 208 is rotated counterclockwise to effect feeding of a sheet-like original document and then the gear 208 is rotated clockwise by a predetermined amount, the clockwise rotational force of the paper feed motor 103 is not correctly transmitted to the gear 228 because of the "play" between the gear 208 and the gear 230 and the "play" created by the spring clutch 711 between the gear 230 and the gear 230a. As a result, a predetermined amount of feeding of the thermal sensitive paper 222 cannot be achieved. To this end, in Step S28, the paper feed motor 103 is reversed clockwise by several steps to adjust the relative displacement between the gear 208 and the gear 230 so as to correctly transmit the clockwise rotation of the gear 208 to the gear 230a. This adjustment is required in not only the above-described case but also the case (Step S31) in which feeding of the thermal sensitive paper 222 is switched to that of a sheet-like original document (in which the direction of motion of the paper feed motor 103 is changed from clockwise to counterclockwise).

Then, in Step S29, the paper feed motor 103 is activated in the clockwise direction to feed the thermal sensitive paper 222 by a predetermined amount, thereby recording the image information which has been read in Step S26 on the thermal sensitive paper 222 by means of the thermal line head 111. In Step S30, the running of the paper feed motor 103 is stopped and is then reversed by several steps in the counterclockwise direction to thereby compensate for the backlash between the gear 208 and the gear 209.

Subsequently, it is determined in Step S32 whether or not copying has been completed. If not, the process proceeds to Step S33, in which the output shaft of the paper feed motor 103 is rotated counterclockwise by a predetermined amount, and the process returns to Step S24. In Step S24, reading of the next line and recording thereof on the thermal sensitive paper 222 are carried out. If it is determined in Step S32 that copying has been completed, the process proceeds to Step S34, in which the thermal sensitive paper 222 is cut into a sheet of predetermined length by the cutter 225. Thus, the process is completed.

It is to be noted that a switch or the like may be provided for specifying the amount of adjustment of blacklash which is made in Step S28 and Step S31 and, in these steps, the set value of the switch is read to determine the amount of reversing of the paper feed motor 103. With this arrangement, even if the amount of "play" between the gear 208 and the gear 209 or the gear 230 is varied due to the abrasion of the gears so that an offset occurs in the amount of feeding of the thermal sensitive paper 222 or the sheet 207, the offset can be adjusted.

In the above description of the presently preferred embodiment, whether serial recording or line recording should be selected is specified at the same time that recording data is input. However, the method of specification is not limited only to the one described above. For example, such specification may be carried out through an operating panel or the like of the reader printer. Alternatively, document data may be serially recorded and dot image data may be recorded in units of lines. Although, in the presently preferred embodiment, line recording is utilized in a thermal recording method using thermal sensitive paper, while serial recording utilizes a thermal transfer method. However, it is a matter of course that the kind of recording method is not limited to these ones.

As described above, in accordance with the presently preferred embodiment, it is possible to effect serial recording on a sheet-like medium and also to effect recording through a line head in units of lines. In addition, it is possible to effect reading from an original document and recording and reproduction of the thus-read original document.

Since a common motor is employed to effect feeding of an original document or a sheet-like medium used for serial recording and feeding of recording paper on which recording is effected in units of lines, it is possible to provide the advantage of reducing manufacturing cost.

Further, since backlash is compensated for by utilizing the reversing of the paper feed motor, it is possible to provide the advantage of compensating for the offset of the read position or the record position, for example, in a copying operation for effecting reading and recording of an original document.

Furthermore, a feed path for serial recording sheets and that for sheet-like original documents to be read are formed as a common feed path, and line recording sheets are fed in the reverse direction below the above-described feed path.

Serial recording sheets and sheet-like original documents are discharged from the top of the apparatus, while line recording sheets are discharged from the rear of the apparatus. Accordingly, the overall apparatus can be made compact.

It is to be noted that the aforementioned sheets includes, for example, ordinary paper, processed paper, OHP plastic sheets and so forth.

In addition, the recording method may be any one or an appropriate combination of a thermal transfer recording method, a thermal sensitive recording method, an ink-jet recording method, an electrophotographic recording method, and so forth.

As is evident from the foregoing, the present embodiment has the advantage that a single recording apparatus can be used to achieve both serial recording and line recording.

It will be appreciated from the foregoing that, in accordance with the present invention, it is possible to provide an image recording apparatus which is capable of effecting image recording by using an optimum recording method which has been appropriately selected in accordance with various conditions.

What is claimed is:

1. An image recording apparatus comprising:

a first mounting means for mounting a first, plain cut recording sheet;

a second mounting means for mounting a second, roll-type thermal sensitive paper recording sheet;

serial recording means comprising a thermal head moveable in the direction transverse to the conveyance route for said first recording sheet for recording on said first recording sheet, said serial recording means recording on said first recording sheet by moving across the conveyance route of said first recording sheet;

line recording means provided across a conveyance route of said second recording sheet comprising a thermal head for recording on said second recording sheet, said thermal head being fixedly disposed across the entire width of the conveyance route for said second recording sheet, said line recording means defining a recording area across the conveyance route of said second recording sheet;

first conveying means for conveying said first recording sheet from said first mounting means to said serial recording means;

second conveying means for conveying said second recording sheet from said second mounting means to said line recording means;

driving means for driving said first conveying means and said second conveying means, said driving means being a step motor common to said first conveying means and said second conveying means; and switching means for switching a drive transmitted from said step motor to either of said first conveying means and said second conveying means, said step motor driving after said drive is switched by said switching means by a predetermined number of steps in a reverse direction relative to a drive direction before said drive is switched by said switching means, where a recording means which performs a recording operation after said drive is switched by said switching means is different from a recording means which performs a recording operation before said drive is switched by said switching means, said recording means comprising either one of said serial recording means and said line recording means.

2. An image recording apparatus according to claim 1, wherein said first conveying means is driven when said drive is rotation in a first direction, while said second conveying means is driven when said drive is rotation in a direction opposite to said first direction.

3. An image recording apparatus according to claim 1, wherein said first conveying means operates to inhibit conveying of the next first recording sheet after a previous first sheet has been conveyed until reading or recording of said first sheet is completed.

4. An image recording apparatus according to claim 1, wherein said first mounting means has a stacker for loading a cut sheet.

5. An image recording apparatus according to claim 1, wherein said second mounting means has a roll-like recording sheet mounting section for accommodating a roll-like recording sheet.

6. An image recording apparatus according to claim 1, wherein said first recording sheet is a plain paper.

7. An image recording apparatus according to claim 1, wherein said second recording sheet is a thermosensitive paper.

8. An image recording apparatus, comprising:

a first mounting means for mounting a first, plain cut recording sheet;

a second mounting means for mounting a second, roll-type thermal sensitive paper recording sheet;

serial recording means comprising a thermal head moveable in the direction transverse to the conveyance route for said first recording sheet for recording on said first recording sheet, said serial recording means recording on said first recording sheet by moving across the conveyance route of said first recording sheet;

line recording means provided across a conveyance route of said second recording sheet comprising a thermal head for recording on said second recording sheet, said thermal head being fixedly disposed across the entire width of the conveyance route for said second recording sheet, said line recording means defining a recording area across the conveyance route of said second recording sheet;

first conveying means for conveying said first recording sheet from said first mounting means to said serial recording means;

second conveying means for conveying said second recording sheet from said second mounting means to said line recording means;

driving means for driving said first conveying means and said second conveying means, said driving means being a step motor common to said first conveying means and said second conveying means;

switching means for switching a drive transmitted from said step motor to either of said first conveying means and said second conveying means, said step motor driving after said drive is switched by said switching means by a predetermined number of steps in a reverse direction relative to a drive direction before said drive is switched by said switching means, a recording means which performs a recording operation after said drive is switched by said switching means being different from a recording means which performs a recording operation before said drive is switched by said switching means, said recording means comprising either one of said serial recording means and said line recording means;

reading means provided along the conveyance route of said first recording sheet to read image information; and control means for controlling recording of said information read by said reading means.

9. An image recording apparatus according to claim 8, wherein said reading means serves to guide said first recording sheet to a recording position.

10. An image recording apparatus according to claim 8, wherein said line recording means is arranged to effect recording and reproduction of said image information which has been photoelectrically input through said read sensor section.

11. An image recording apparatus according to claim 8, wherein said first mounting means has a stacker for loading a cut sheet.

12. An image recording apparatus according to claim 8, wherein said second mounting means has a roll-like recording sheet mounting section for accommodating a roll-like recording sheet.

13. An image recording apparatus according to claim 8, wherein said first recording sheet is a plain paper.

14. An image recording apparatus according to claim 8, wherein said second recording sheet is a thermosensitive paper.

15. An image recording apparatus comprising:
  a first mounting means for mounting a first, plain cut recording sheet;
  a second mounting means for mounting a second, roll-type thermal sensitive paper recording sheet;
  serial recording means comprising a thermal head moveable in the direction transverse to the conveyance route for said first recording sheet for recording on said first recording sheet, said serial recording means recording on said first recording sheet by moving across the conveyance route of said first recording sheet;
  line recording means provided across a conveyance route of said second recording sheet comprising a thermal head for recording on said second recording sheet, said thermal head being fixedly disposed across the entire width of the conveyance route for said second recording sheet, said line recording means defining a recording area across the conveyance route of said second recording sheet;
  first conveying means for conveying said first recording sheet from said first mounting means to said serial recording means;
  second conveying means for conveying said second recording sheet from said second mounting means to said line recording means;
  driving means for driving said first conveying means and said second conveying means, said driving means being a step motor common to said first conveying means and said second conveying means; and
  switching means for switching a drive transmitted from said step motor to either of said first conveying means and said second conveying means, said step motor driving after said drive is switched by said switching means by a predetermined number of steps in a reverse direction relative to a drive direction before said drive is switched by said switching means, a recording means which performs a recording operation after said drive is switched by said switching means being different from a recording means which performs a recording operation before said drive is switched by said switching means, said recording means comprising either one of said serial recording means and said line recording means; and
  control means for controlling said driving means in such a manner that there is no difference between a conveyance amount of said first recording sheet by said first conveying means and a conveyance amount of said second recording means by said second conveying means.

16. An image recording apparatus according to claim 15, wherein said first conveying means operates to inhibit conveying of a next first recording sheet after a previous first sheet has been fed until reading or recording of said previous first sheet is completed.

17. An image recording apparatus according to claim 2, further comprising control means for controlling said driving means in such a manner that there is no difference between a conveyance amount of said first recording sheet by said first conveying means and a conveyance amount of said second recording means by said second conveying means.

18. An image recording apparatus according to claim 15, wherein said first mounting means has a stacker for loading a cut sheet.

19. An image recording apparatus according to claim 15, wherein said second mounting means has a roll-like recording sheet mounting section for accommodating a roll-like recording sheet.

20. An image recording apparatus according to claim 15, wherein said first recording sheet is a plain paper.

21. An image recording apparatus according to claim 15, wherein said second recording sheet is a thermosensitive paper.

22. An image forming apparatus, comprising:
  a first support portion for supporting a first recording sheet on which recording is effected by transfer thereto of an ink of an ink sheet;
  a second support portion for supporting a second recording sheet which generates a color image when heat is applied thereto;
  a first recording mechanism for recording on the first recording sheet, said first recording mechanism comprising a carriage including an ink ribbon mount portion and a thermal head and shiftable in a direction across a conveyance route of the first recording sheet;
  a second recording mechanism for recording on the second recording sheet, said second recording mechanism comprising a thermal head including heat generating elements transversely disposed so as to cover a full width of the second recording sheet passing thereby;
  a first conveying mechanism for conveying the first recording sheet from said first support portion to a first recording area of said first recording mechanism;
  a second conveying mechanism for conveying the second recording sheet from said second support portion to a second recording area of said second recording mechanism;
  driving means for driving said first conveying means and said second conveying means, said driving means being a step motor common to said first conveying means and said second conveying means;
  switching means for switching a drive transmitted from said step motor to either of said first conveying means and said second conveying means, said step motor driving after said drive is switched by said switching means by a predetermined number of steps in a reverse direction relative to a drive direction before said drive is switched by said switching means, a recording mechanism which performs a recording operation after said drive is switched by said switching means being different from a recording mechanism which performs a recording operation before said drive is switched by said switching means, said recording mechanism comprising either one of said first recording mechanism and said second recording mechanism; and a control portion for controlling by selecting one of a first mode and a second mode, wherein in the first mode recording is effected onto the first recording sheet conveyed by said first conveying mechanism by using said first recording mechanism, and in the second mode recording is effected onto the second recording sheet conveyed by said second conveying mechanism by using said second recording mechanism.

23. An image forming apparatus, comprising:

a first support portion for supporting a first recording sheet on which recording is effected by transfer thereto of an ink of an ink sheet;

a second support portion for supporting a second recording sheet which generates a color image when heat is applied thereto, said second supporting portion being capable of supporting an original sheet;

a first recording mechanism for recording on the first recording sheet, said first recording mechanism comprising a carriage including an ink ribbon mount portion and a thermal head and shiftable in a direction across a conveyance route of the first recording sheet;

a second recording mechanism for recording on the second recording sheet, said second recording mechanism comprising a thermal head including heat generating elements transversely disposed so as to cover a full width of the second recording sheet passing thereby;

an original read mechanism disposed along a conveyance route of the first recording sheet;

a first conveying mechanism for conveying the first recording sheet or the original sheet from said first support means to an area where said first recording mechanism is disposed and an area where said original read mechanism is disposed;

a second conveying mechanism for conveying the second recording sheet from said second support portion to a recording area included in said second recording mechanism;

driving means for driving said first conveying means and said second conveying means, said driving means being a step motor common to said first conveying means and said second conveying means;

switching means for switching a drive transmitted from said step motor to either of said first conveying means and said second conveying means, said step motor driving after said drive is switched by said switching means by a predetermined number of steps in a reverse direction relative to a drive direction before said drive is switched by said switching means, a recording mechanism which performs a recording operation after said drive is switched by said switching means being different from a recording mechanism which performs a recording operation before said drive is switched by said switching means, said recording mechanism comprising either one of said first recording mechanism and said second recording mechanism; and a control portion for controlling by selecting a one of a first mode, a second mode, and a third mode, wherein in the first mode recording is effected onto the first recording sheet conveyed by said first conveying mechanism by said first recording mechanism, in the second mode an image information on the original sheet conveyed by said first conveying mechanism is read by said original read mechanism, and in the third mode recording is effected onto the second recording sheet conveyed by said second conveying mechanism by said second recording mechanism.

24. A method for recording an image on a recording medium by using a first member to be driven for recording with ink, a first driving mechanism for said first member, a second member to be driven for recording which is different from said first member, a second driving mechanism for said second member, driving means for driving said first mechanism and driving means for driving said second driving mechanism, said method comprising the steps of:

providing a common step motor for driving said first driving mechanism and said second driving mechanism;

providing a switching mechanism for switching a drive transmitted from said step motor to either of said first driving mechanism and said second driving mechanism;

switching said drive using said switching mechanism; and driving, in a reverse direction relative to a drive direction before said switching step, by a predetermined number of steps using said step motor after said drive is switched in said switching step, where a member driven for recording after said switching step is different from a member driven for recording before said switching step, said member comprising one of said first member and said second member.

25. A method according to claim 24, wherein in said driving step said predetermined number of steps is such that a backlash of both said first driving mechanism and said second driving mechanism is corrected.

26. A method according to claim 24, wherein said second member to be driven is a thermosensitive continuous recording medium.

27. A method according to claim 24, wherein said first member to be driven is a cut recording medium.

28. A method according to claim 24, wherein in said switching step said switching mechanism switches said drive by changing a rotation direction of said step motor.

29. A method according to claim 26, further comprising the step of recording on said thermosensitive continuous recording medium using a full-line thermal head having a heat generating element disposed along a direction perpendicular to a driving direction of said thermosensitive continuous recording medium.

30. A method according to claim 27, further comprising the step of recording on said cut recording medium using a thermal recording head moving in a direction perpendicular to a driving direction of said cut recording medium.

31. An image recording apparatus according to any of claims 1, 8, 15, 22 and 23, wherein said step motor is driven by said predetermined number of steps so that a backlash of both said first driving mechanism and said second driving mechanism is corrected.

32. An image recording apparatus according to any of claims 1, 8, 15, 22 and 23, wherein said switching mechanism switches the drive transmission by changing a rotation direction of said step motor.

* * * * *

UNITED STATES PATENT AND TRADEMARK OFFICE
CERTIFICATE OF CORRECTION

PATENT NO. : 5,529,407
DATED : June 25, 1996
INVENTOR(S) : KUNIHIKO IKEDA ET AL.            Page 1 of 3

It is certified that error appears in the above-identified patent and that said Letters Patent is hereby corrected as shown below:

COLUMN 2

Line 18, "has" should read --having--.

COLUMN 3

Line 1, "and FIGS. 9A" should read --and ¶ FIGS. 9A--.
    Line 11, "(Overall" should read --Overall--.

COLUMN 4

Line 62, "posiiton" should read --position--.

COLUMN 5

Line 15, "dentoes" should read --denotes--.
    Line 50, "provide" should read --provides--.

COLUMN 6

Line 30, "in approximate" should read --approximately--.

COLUMN 9

Line 5, "disappear," should read --disappears,--.
    Line 44, "coutnerclockwise" should read --counterclockwise--.
    Line 45, "gear 240," should read --gears 240,--.
    Line 59, "coutnerclockwise" should read --counterclockwise-.

UNITED STATES PATENT AND TRADEMARK OFFICE
CERTIFICATE OF CORRECTION

PATENT NO. : 5,529,407
DATED : June 25, 1996
INVENTOR(S) : KUNIHIKO IKEDA ET AL.

It is certified that error appears in the above-identified patent and that said Letters Patent is hereby corrected as shown below:

COLUMN 10

Line 54, "senor 105" should read --sensor 105--.
Line 58, "this" should read --thus--.

COLUMN 11

Line 43, "shfited" should read --shifted--.

COLUMN 13

Line 5, "includes," should read --include,--.

COLUMN 15

Line 8, "read sensor" should read --reading means.--.
Line 9, "section." should be deleted.

COLUMN 16

Line 47, "mechanism" should read --means--.
Line 50, "mechanism" should read --means--.

COLUMN 17

Line 36, "mechanism" should read --means--.
Line 38, "means" should read --portion--.
Line 41, "mechanism" should read --means--.

UNITED STATES PATENT AND TRADEMARK OFFICE
CERTIFICATE OF CORRECTION

PATENT NO. : 5,529,407
DATED      : June 25, 1996
INVENTOR(S): KUNIHIKO IKEDA ET AL.          Page 3 of 3

It is certified that error appears in the above-identified patent and that said Letters Patent is hereby corrected as shown below:

COLUMN 18

Line 14, "first" should read --first driving--.

Signed and Sealed this

Twenty-eighth Day of January, 1997

Attest:

BRUCE LEHMAN

*Attesting Officer*     *Commissioner of Patents and Trademarks*